United States Patent
Dionne

(10) Patent No.: US 6,736,087 B1
(45) Date of Patent: May 18, 2004

(54) MILK SAMPLER

(76) Inventor: Martin Dionne, 1026 des Outardes, st-Jean Chrysostome (CA), G6Z 3E9

( * ) Notice: Subject to any disclaimer, the term of this patent is extended or adjusted under 35 U.S.C. 154(b) by 0 days.

(21) Appl. No.: 10/449,784

(22) Filed: Jun. 2, 2003

(51) Int. Cl.$^7$ ................................ A01J 7/00; A01J 3/00
(52) U.S. Cl. ................................ 119/14.18; 119/14.17; 119/14.14
(58) Field of Search ............................. 119/14.18, 14.2, 119/14.14, 14.4, 14.41, 14.17; 73/863.86, 863.01, 863.31

(56) References Cited

U.S. PATENT DOCUMENTS

| | | | | |
|---|---|---|---|---|
| 1,534,939 A | * | 4/1925 | James ...................... 73/864.51 |
| 1,972,144 A | * | 9/1934 | Cyrus ........................ 137/179 |
| 3,174,345 A | * | 3/1965 | Syd ............................. 73/203 |
| 3,599,607 A | * | 8/1971 | Wallick .................... 119/14.17 |
| 3,841,756 A | * | 10/1974 | Grochowicz ................. 356/72 |
| 3,919,975 A | * | 11/1975 | Duncan .................... 119/14.05 |
| 4,016,832 A | * | 4/1977 | Kiestra ..................... 119/14.14 |
| 4,030,356 A | * | 6/1977 | Jaquith ........................ 73/195 |
| 4,213,341 A | * | 7/1980 | Wenham .................. 73/863.43 |
| 4,452,176 A | * | 6/1984 | Hoefelmayr et al. ..... 119/14.17 |
| 4,476,719 A | * | 10/1984 | Millar et al. .................. 73/200 |
| 4,608,864 A | * | 9/1986 | Savoyet ....................... 73/202 |
| 5,012,762 A | * | 5/1991 | Moskvin .................. 119/14.19 |
| 5,080,040 A | * | 1/1992 | van der Lely et al. .... 119/14.09 |
| 5,388,549 A | * | 2/1995 | Holroyd .................. 119/14.14 |
| 5,604,320 A | * | 2/1997 | Boyd ....................... 73/863.86 |
| 5,645,012 A | * | 7/1997 | Hoefelmayr ............. 119/14.14 |
| 5,746,153 A | * | 5/1998 | Hoefelmayr ............. 119/14.01 |

\* cited by examiner

*Primary Examiner*—Yvonne Abbott

(57) ABSTRACT

The present invention is a device used to take the milk samples from each milking cow without slowing down the milking, and the milk samples taken are analysed in order to determine the protein, fat content, carbohydrate, mineral matter and vitamin rates.

1 Claim, 5 Drawing Sheets

MILK SAMPLER

BACKGROUND OF THE INVENTION

1. Field of the Invention:

The present invention relates to a device used to take the milk samples from each milking cow without slowing down the milking, and the milk samples taken are analysed in order to determine the protein, fat content, carbohydrate, mineral matter and vitamin rates.

2. Description of the Related Art:

A search of prior art records has unveiled the following patents:

1. U.S. Pat. No. 5,012,762 issued in 1991 to Moskvin;
2. U.S. Pat. No. 4,608,864 issued in 1986 to Savoyet;
3. U.S. Pat. No. 5,080,040 issued in 1992 to Van Der Lely;
4. U.S. Pat. No. 4,476,719 issued in 1984 to Millar;
5. U.S. Pat. No. 3,841,756 issued in 1974 to Grochowicz;
6. U.S. Pat. No. 5,645,012 issued in 1997 to Hoefelmayr;
7. U.S. Pat. No. 5,746,153 issued in 1998 to Hoefelmayr;
8. U.S. Pat. No. 4,452,176 issued in 1984 to Hoefelmayr;
9. U.S. Pat. No. 5,388,549 issued in 1995 to Holroyd;
10. U.S. Pat. No. 4,016,832 issued in 1977 to Kiestra;
11. U.S. Pat. No. 3,174,345 issued in 1965 to Bodmin;
12. U.S. Pat. No. 4,030,356 issued in 1977 to Jaquith; and
13. U.S. Pat. No. 1,972,144 issued in 1934 to Hapgood.

As can be seen the patents mentioned above are probably the most relevant.

The proposed system is a device made up of an adjustable and bevelled nozzle including a slot in which is inserted a rubber ring for guarantee the waterproofness of device, and which is connected into an upper connection from a tubular member which is mounted to a milking line (not shown) of a conventional machine operating by vacuum pulsation, and maintained inside the upper connection by a blocking member which is engaged onto the nozzle and upper connection.

A pipe is engaged into the nozzle and engaged into a hole of a cap adapted to a sampling bottle to take the milk samples by turning the tip of the nozzle upwards or downwards controlling the milk flow towards the sampling bottle.

An elbow is provided with two legs which each leg is engaged into a hole of cap for it maintain firmly in place and it prevent to move, and which is engaged and blocked into a lower connection of tubular member which is mounted to a milking line (not shown) of the conventional machine operating by vacuum pulsation.

Advantages

Time saving;
Adaptable to all existing systems on the market;
No assembly required;
Easy to use; and
Light and compact.

SUMMARY OF THE INVENTION

It has been discovered that the present invention described herein relates to a device used to take the milk samples from each milking cow without slowing down the milking, and the milk samples taken are analysed in order to determine the protein, fat content, carbohydrate, mineral matter and vitamin rates.

BRIEF DESCRIPTION OF THE SEVERAL VIEWS OF THE DRAWINGS(S)

Figure 1:
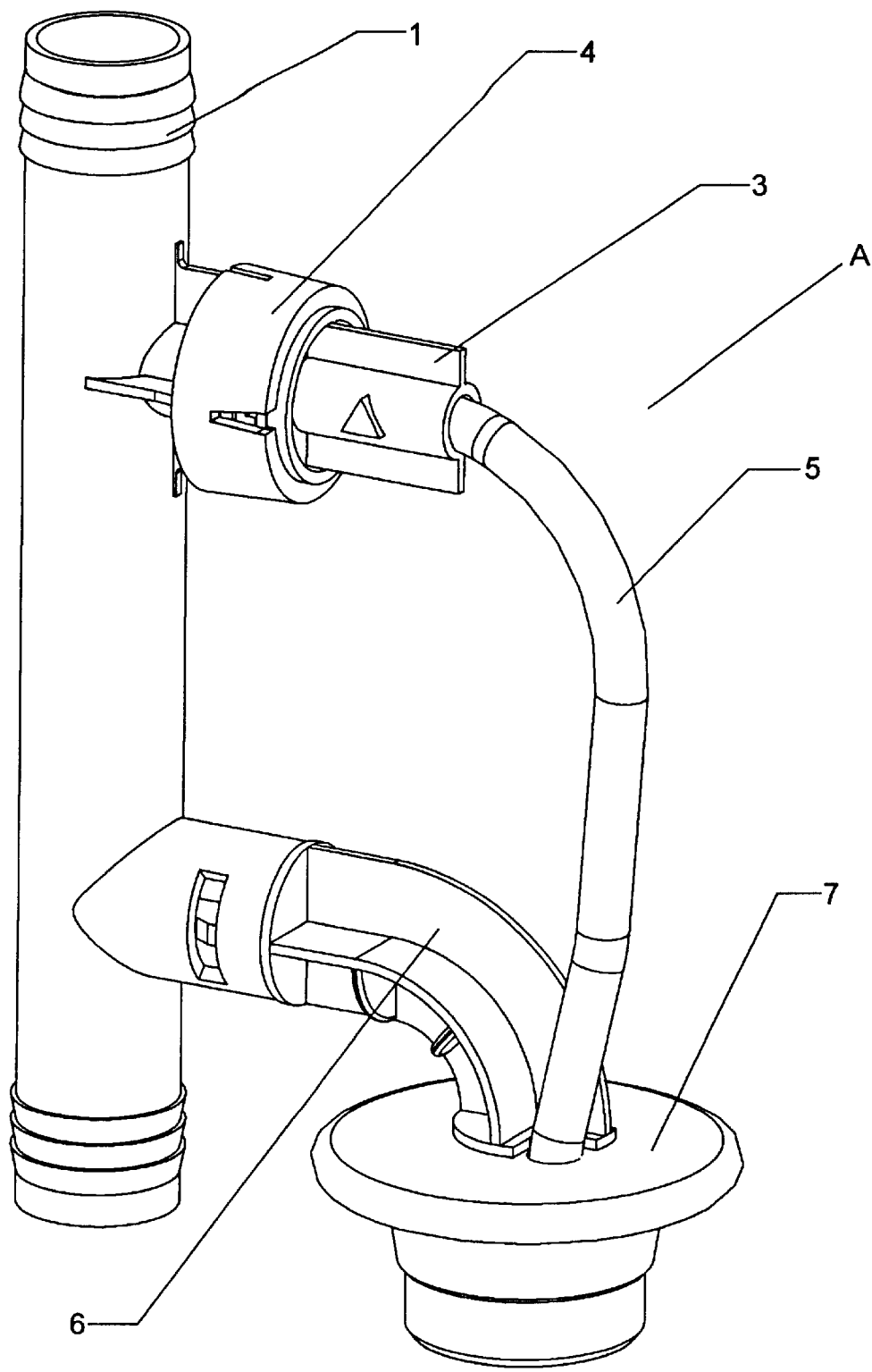
Figure 2:
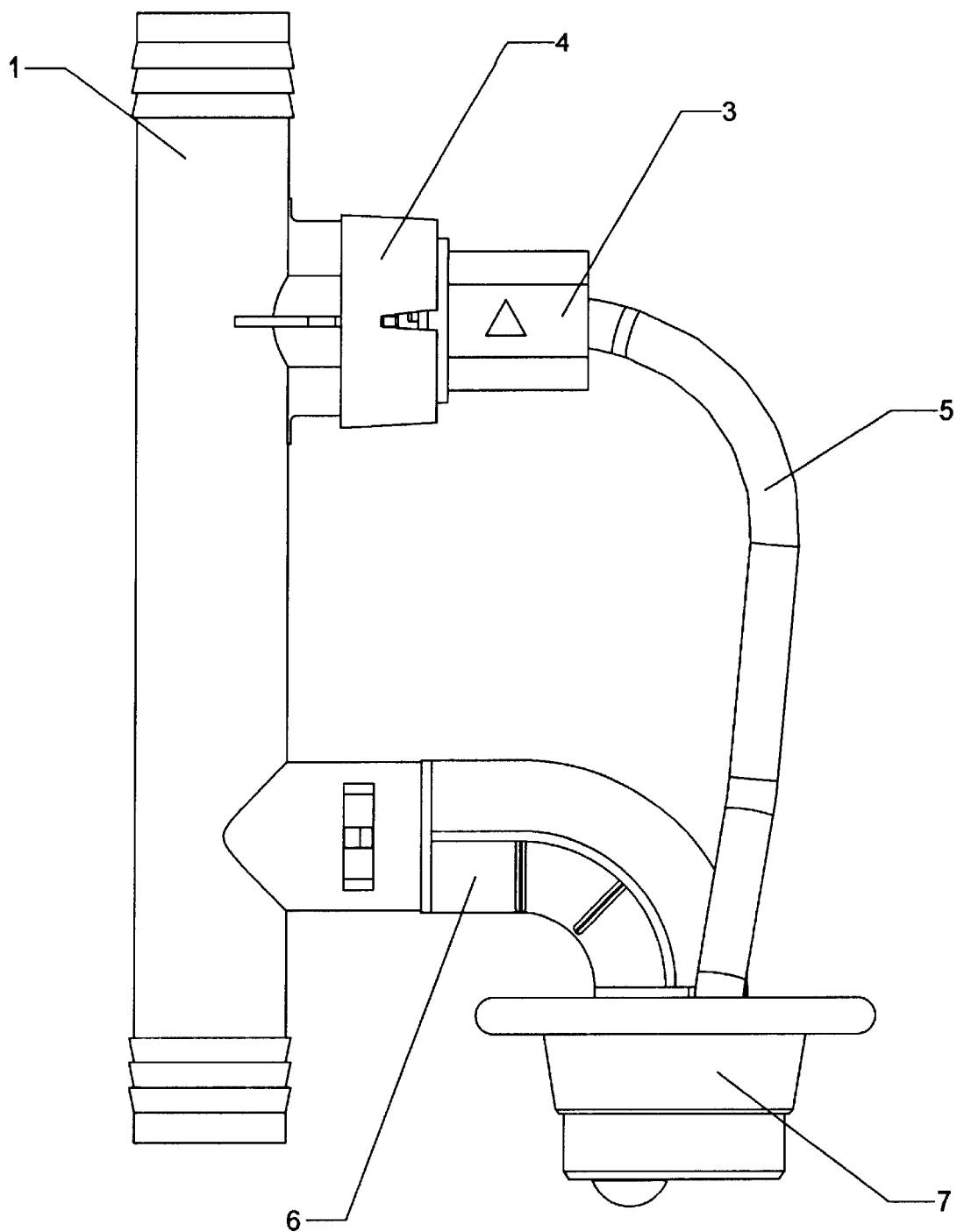
Figure 3:
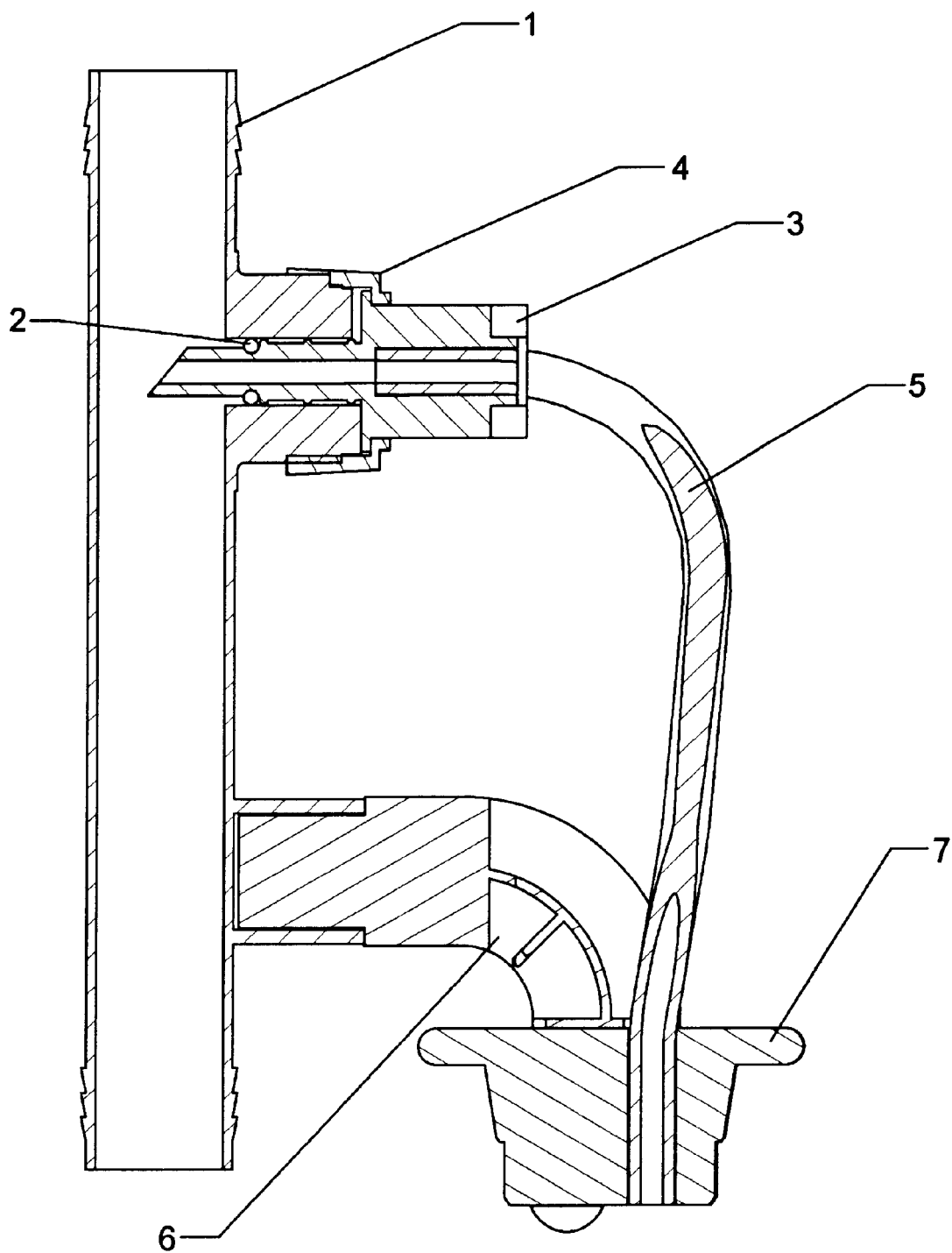
Figure 4:
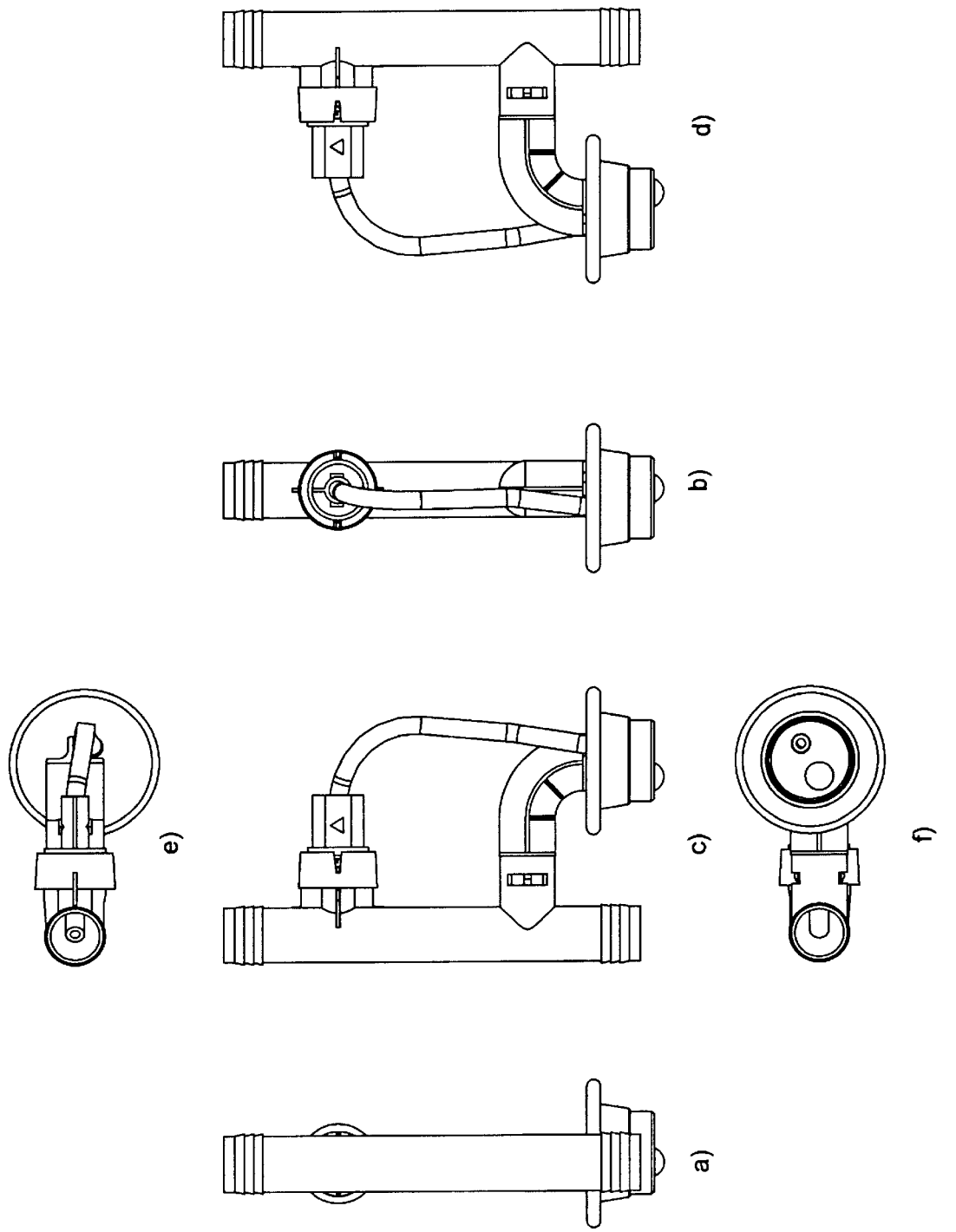
Figure 5:
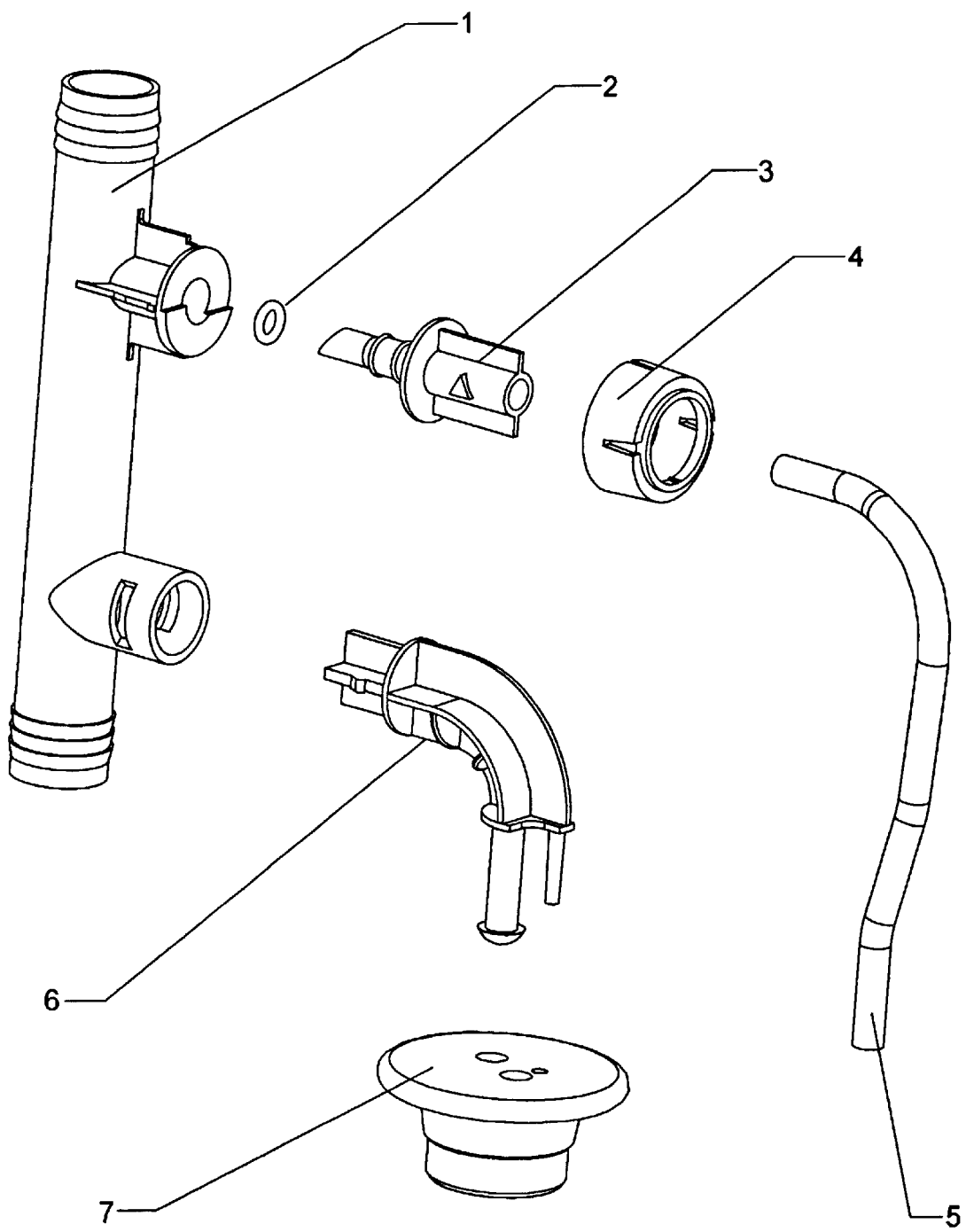

Having thus generally described the invention, reference will be made to the accompanying drawings illustrating an embodiment thereof, in which:

FIG. 1 is a perspective right side view of a device used to take the milk samples;
FIG. 2 is a plan right side view thereof;
FIG. 3 is a cross-section right side view thereof;
FIG. 4a is a rear view thereof;
FIG. 4b is a front view thereof;
FIG. 4c is right side view thereof;
FIG. 4d is a left side view thereof;
FIG. 4e is a top view thereof;
FIG. 4f is a bottom view thereof; and
FIG. 5 is an exploded view thereof.

DESCRIPTION OF THE PREFERRED EMBODIMENTS

Referring to the drawings in greater detail, and by reference characters thereto, there is illustrated in FIGS. 1 to 5 a device, which is generally designated by reference numeral (A).

Referring to FIGS. 1 to 5, there is illustrated a device (A) made up of an adjustable and bevelled nozzle (3) including a slot in which is inserted a rubber ring (2) for waterproofing of device, and which is connected into an upper connection from a tubular member (1) which is mounted to a milking line (not shown) of a conventional machine operating by vacuum pulsation, and maintained inside the upper connection by a blocking member (4) which is engaged onto the nozzle (3) and upper connection.

A pipe (5) is engaged into the nozzle (3) and connected into a hole of a cap (7) adapted to a sampling bottle (not shown) to take the milk samples by turning the tip of the nozzle upwards or downwards controlling the milk flow towards the sampling bottle.

An elbow provided with two legs (6) which each leg is engaged into a hole of cap (7) maintaining it firmly in place and preventing it from moving, and which is connected into a lower connection of tubular member (1) which is mounted to a milking line (not shown) of the conventional machine operating by vacuum pulsation.

It will be understood that the above described embodiment are for purposes of illustration only and that changes and modifications may be made thereto without departing from the spirit and scope of the invention.

The embodiments of the invention for which an exclusive property or privilege is claimed, are defined as follows:

1. A device used to take milk samples comprising an adjustable and bevelled nozzle including a slot in which is inserted a rubber ring for waterproofing of said device, and which is connected into an upper connection from a tubular member which is mounted to a milking line of a conventional machine operating by vacuum pulsation, and maintained inside said upper connection by a blocking member which is engaged onto said nozzle and said upper connection; a pipe engaged into said nozzle and connected into a hole of a cap adapted to a sampling bottle to take the milk samples by turning the tip of the nozzle upwards or downwards controlling the milk flow towards the sampling bottle; and an elbow provided with two legs which each leg is engaged into a hole of said cap maintaining it firmly in place and preventing it from moving, and which is connected into a lower connection of said tubular member which is mounted to a milking line of the conventional machine operating by vacuum pulsation.

* * * * *